United States Patent
Ikemoto et al.

(10) Patent No.: US 10,087,100 B2
(45) Date of Patent: Oct. 2, 2018

(54) METHOD OF MANUFACTURING GLASS PLATE HAVING CURVED SURFACE SHAPE, AND GLASS PLATE HAVING A CURVED SURFACE SHAPE

(71) Applicant: NIPPON ELECTRIC GLASS CO., LTD., Otsu-shi, Shiga (JP)

(72) Inventors: Masayuki Ikemoto, Otsu (JP); Osamu Odani, Otsu (JP); Masanori Wada, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 422 days.

(21) Appl. No.: 14/769,130

(22) PCT Filed: Feb. 13, 2014

(86) PCT No.: PCT/JP2014/053254
§ 371 (c)(1),
(2) Date: Aug. 20, 2015

(87) PCT Pub. No.: WO2014/167894
PCT Pub. Date: Oct. 16, 2014

(65) Prior Publication Data
US 2015/0368140 A1    Dec. 24, 2015

(30) Foreign Application Priority Data
Apr. 10, 2013 (JP) .................. 2013-081933

(51) Int. Cl.
*C03B 23/00* (2006.01)
*C03B 23/03* (2006.01)

(52) U.S. Cl.
CPC ...... *C03B 23/0013* (2013.01); *C03B 23/0302* (2013.01); *C03B 23/0307* (2013.01); *Y10T 428/24628* (2015.01)

(58) Field of Classification Search
CPC ............ C03B 23/0013; C03B 23/0302; C03B 23/0307
See application file for complete search history.

(56) References Cited

U.S. PATENT DOCUMENTS 3,459,521 A * 8/1969 Nedelec ............. C03B 23/0252
65/104
4,516,997 A * 5/1985 Derner .................... C03B 23/03
65/106

(Continued)

FOREIGN PATENT DOCUMENTS

CN    1118770 A    3/1996
CN    1915872 A    2/2007

(Continued)

OTHER PUBLICATIONS

Official Communication issued in International Patent Application No. PCT/JP2014/053254, dated May 27, 2014.

*Primary Examiner* — Queenie S Dehghan
(74) *Attorney, Agent, or Firm* — Keating and Bennett, LLP

(57) ABSTRACT

Provided is a method that can manufacture a glass plate having a curved surface shape with high surface accuracy even without polishing the surface after forming and a glass plate manufactured by the method. The method of manufacturing a glass plate having a curved surface shape includes the steps of: preparing an original glass plate, a forming die (10) including a recess (11) corresponding to the curved surface shape, and a forming tool (20) operable to press the original glass plate (2); placing the original glass plate (2) on the recess (11) in the forming die (10); heating the original glass plate (2) and the forming die (10); maintaining a temperature of a surface of the recess (11) in the forming die at a temperature lower than a temperature of the original glass plate (2); and giving the original glass plate (2)

(Continued)

the curved surface shape by pressing the heated original glass plate (2) with the forming tool (20) to deform the original glass plate (2) while bringing the original glass plate (2) into contact with the surface of the recess (11).

6 Claims, 9 Drawing Sheets

(56) References Cited

U.S. PATENT DOCUMENTS

| | | | |
|---|---|---|---|
| 5,755,845 A | | 5/1998 | Woodward et al. |
| 8,833,106 B2* | | 9/2014 | Dannoux ............ C03B 23/0256 |
| | | | 65/106 |
| 2010/0000259 A1 | | 1/2010 | Ukrainczyk et al. |
| 2010/0316847 A1 | | 12/2010 | Schillert et al. |
| 2012/0058303 A1 | | 3/2012 | Gabel et al. |
| 2014/0013803 A1* | | 1/2014 | Hwang ............... C03B 23/0305 |
| | | | 65/32.1 |
| 2014/0202211 A1* | | 7/2014 | Horn ..................... C03B 11/00 |
| | | | 65/106 |
| 2015/0203394 A1 | | 7/2015 | Ukrainczyk et al. |

FOREIGN PATENT DOCUMENTS

| | | |
|---|---|---|
| CN | 102083759 A | 6/2011 |
| CN | 202079783 U | 12/2011 |
| CN | 102348653 A | 2/2012 |
| CN | 102601994 A | 7/2012 |
| GB | 765094 A | 1/1957 |
| JP | 35-16443 B | 2/1954 |
| JP | 08-034630 A | 2/1996 |
| JP | 2010-275187 A | 12/2010 |
| JP | 2011-526874 A | 10/2011 |
| JP | 2013-136472 A | 7/2013 |

* cited by examiner

[FIG. 1.]
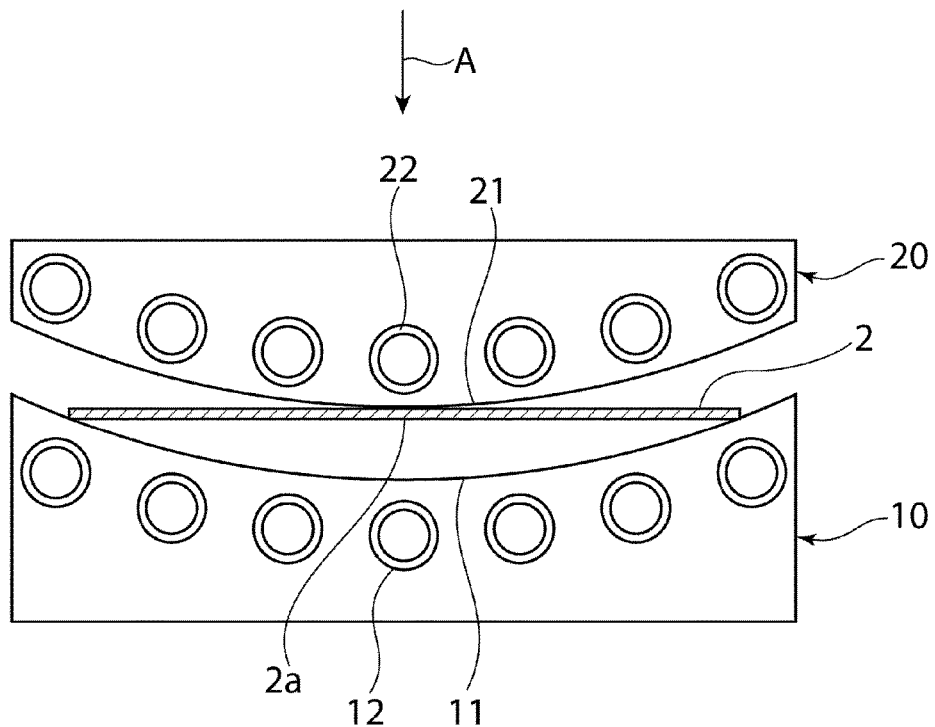
[FIG. 2.]
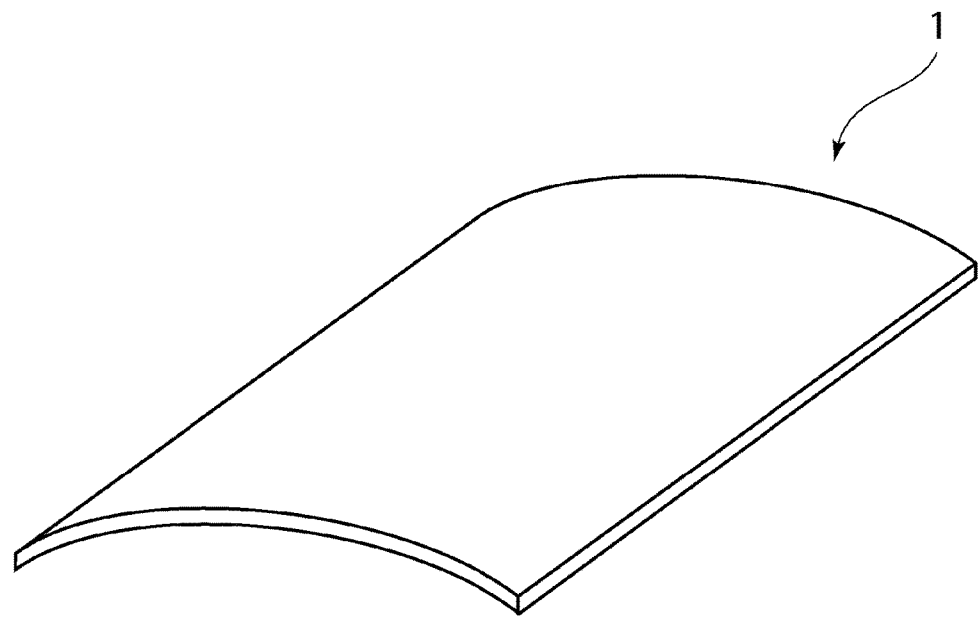

[FIG. 3.]
[FIG. 4.]
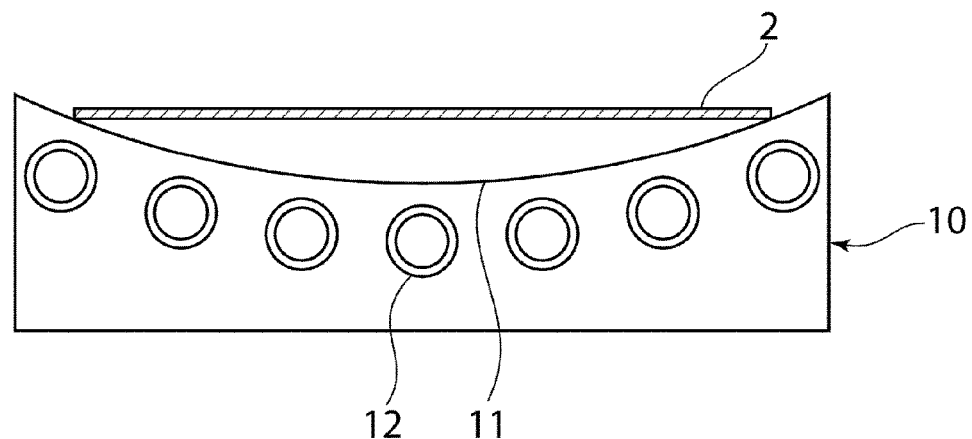

[FIG. 5.]
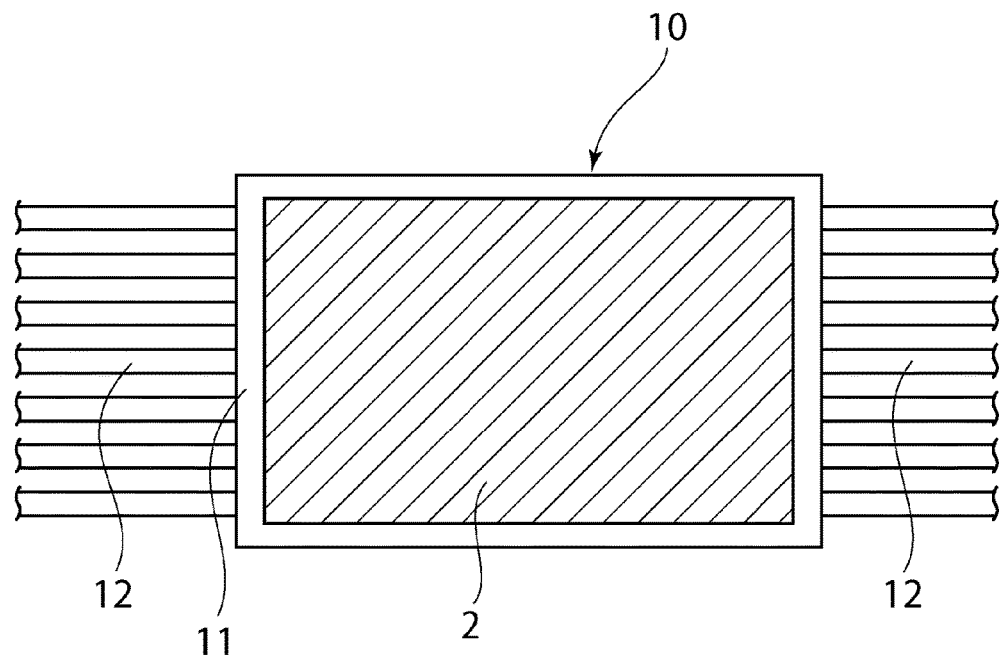
[FIG. 6.]
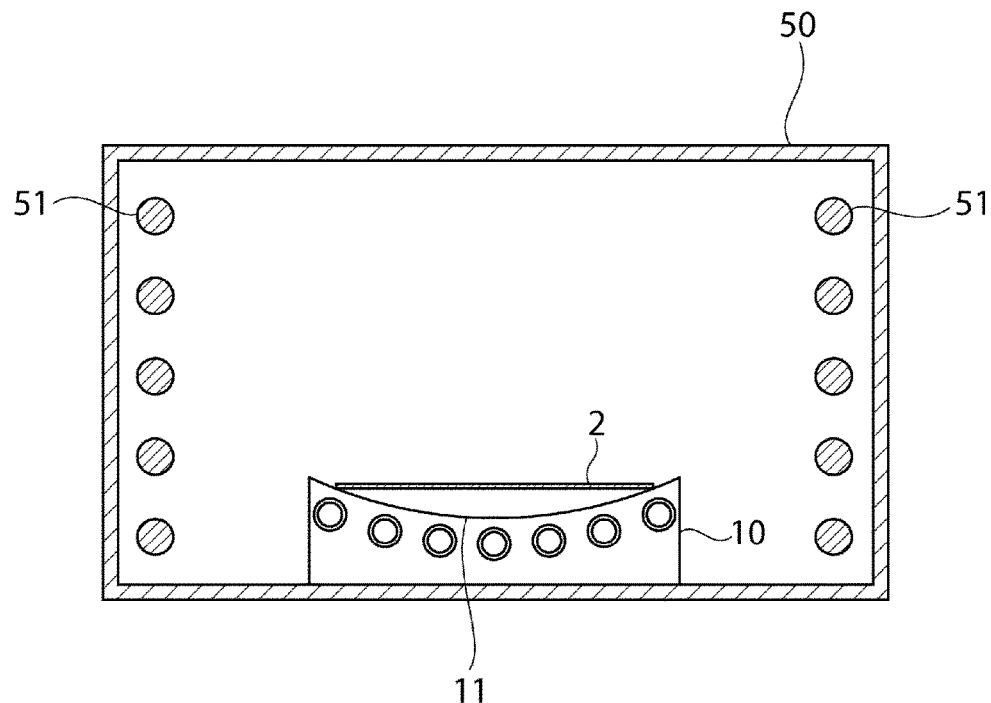

[FIG. 7.]
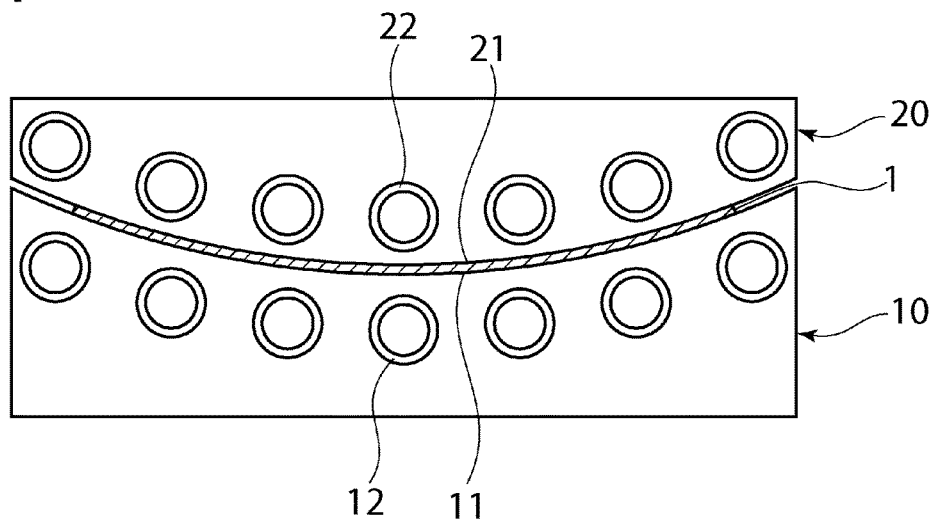
[FIG. 8.]
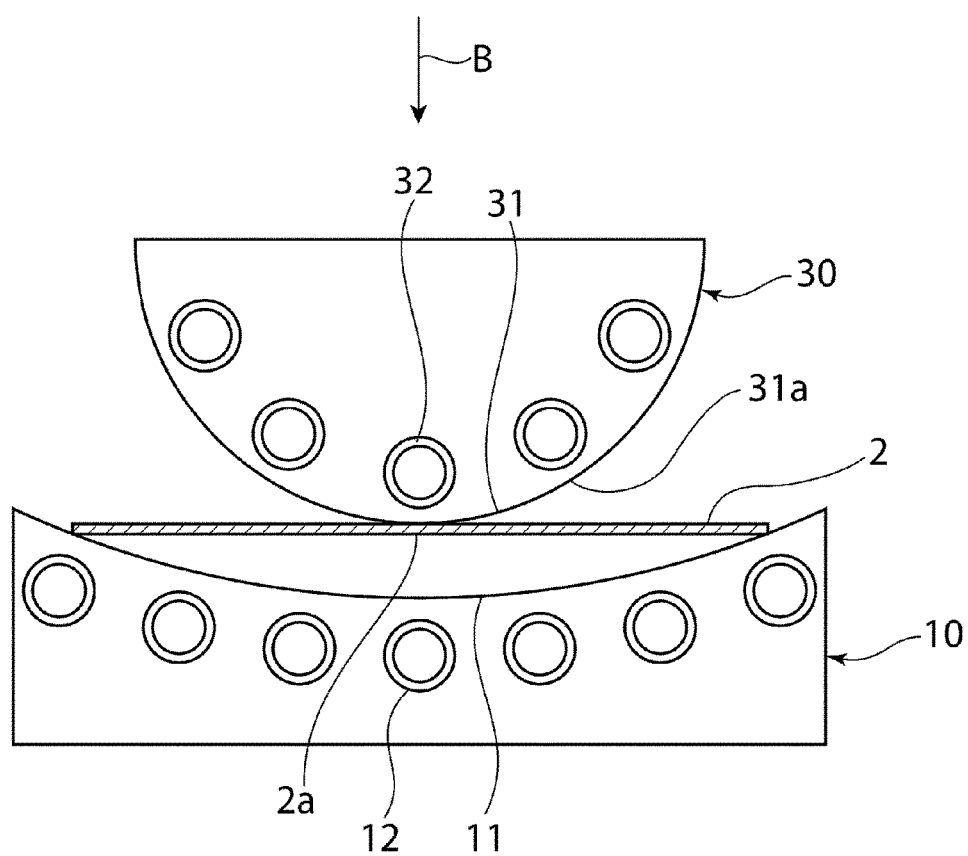

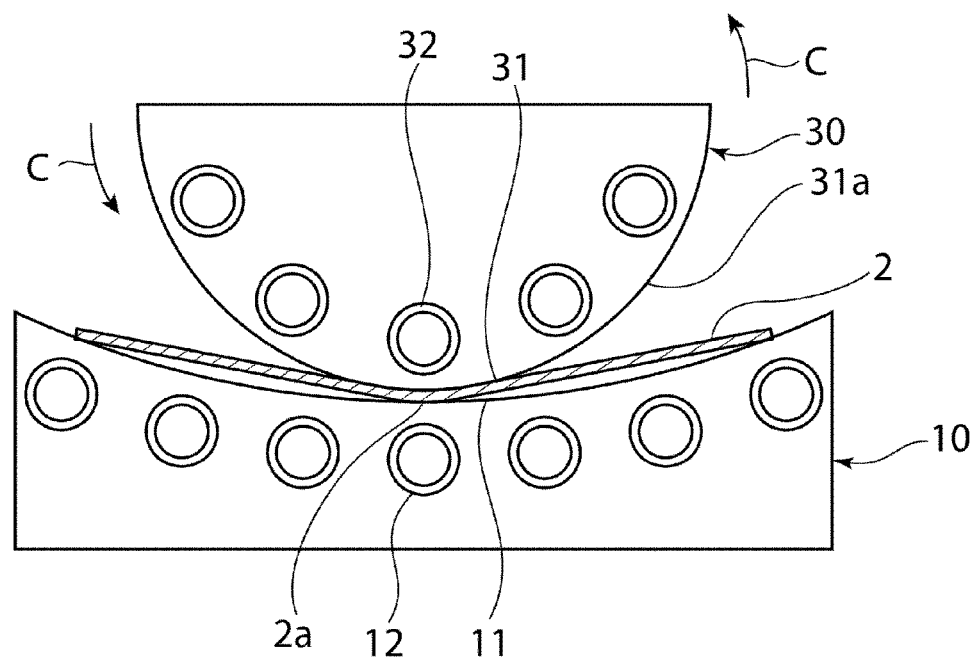
[FIG. 9.]

[FIG. 10.]
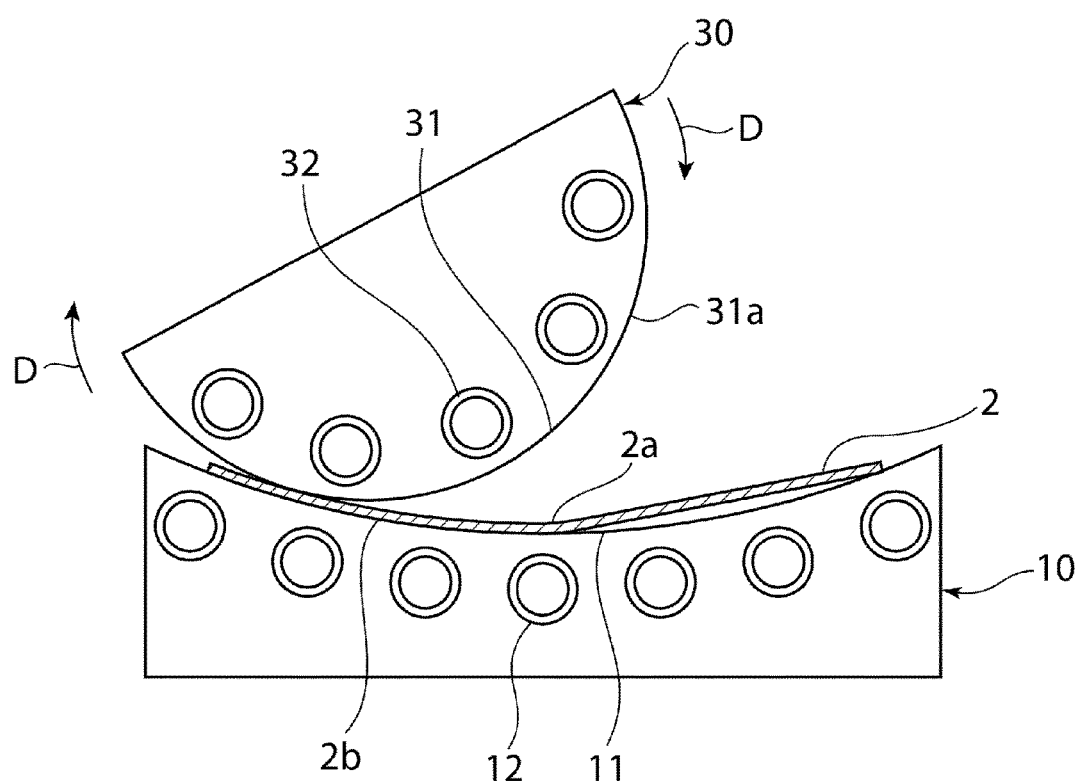

[FIG. 11.]
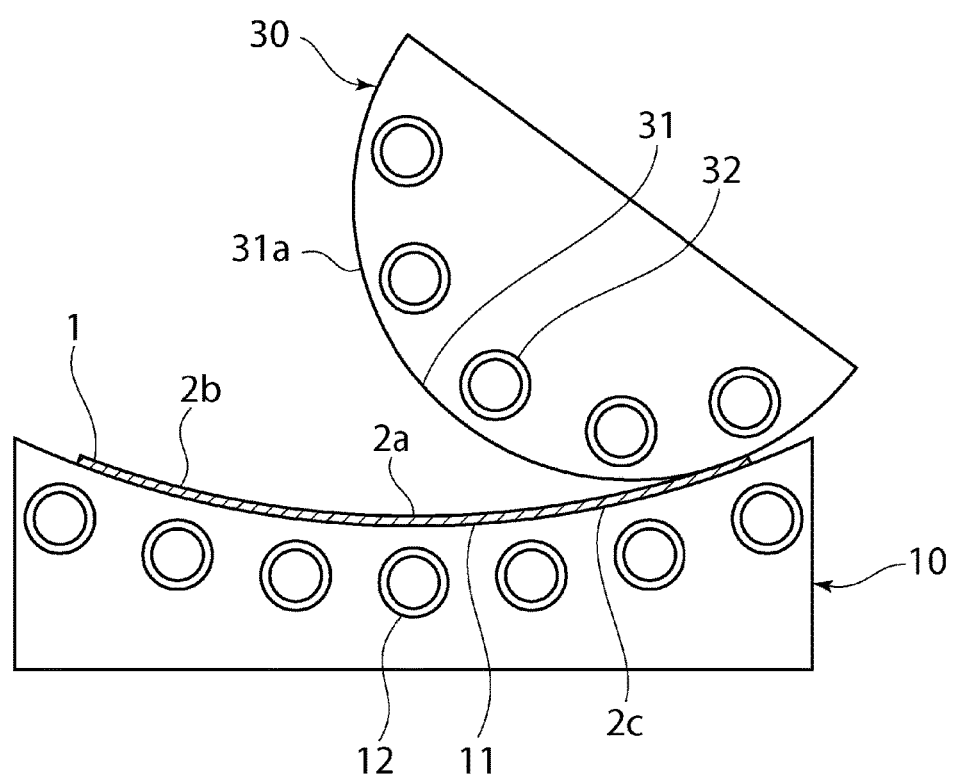

[FIG. 12.]
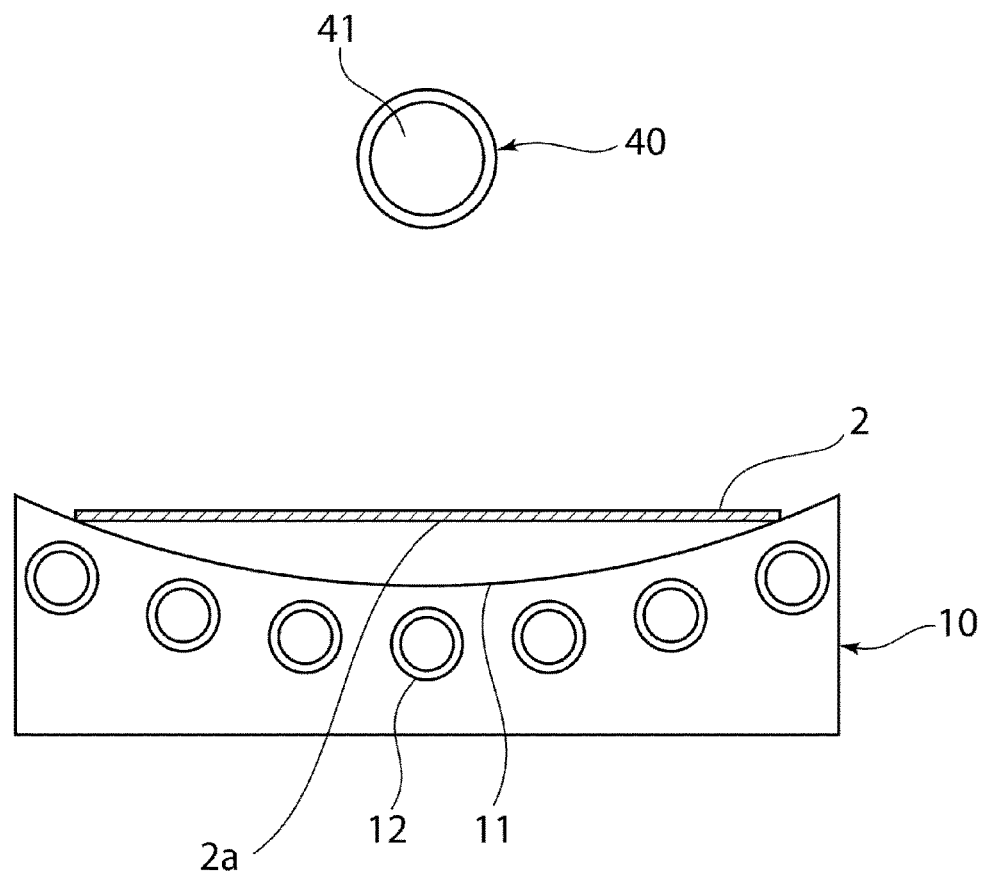

[FIG. 13.]
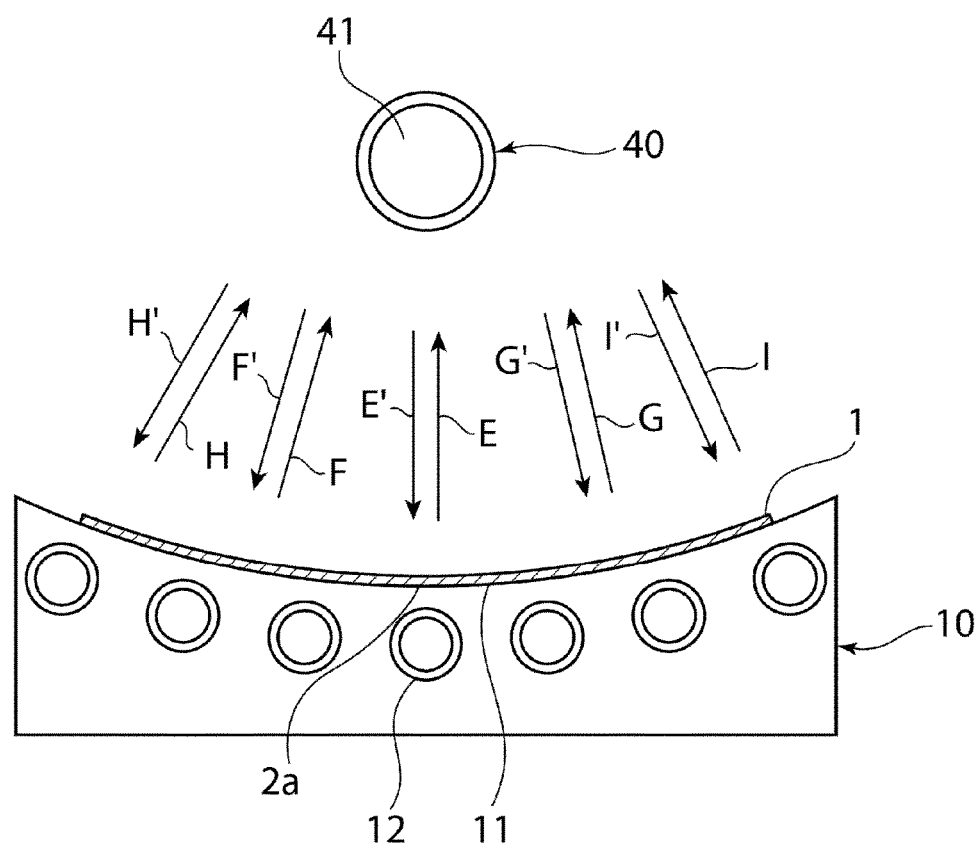

METHOD OF MANUFACTURING GLASS PLATE HAVING CURVED SURFACE SHAPE, AND GLASS PLATE HAVING A CURVED SURFACE SHAPE

TECHNICAL FIELD

This invention relates to a method of manufacturing a glass plate having a curved surface shape and a glass plate having a curved surface shape obtained by the manufacturing method.

BACKGROUND ART

Mobile devices with a display, including cellular phones, smartphones, notebook personal computers, and tablet personal computers, have recently been widely used. A display is also used in in-vehicle equipment, such as car-mounted navigation systems.

A cover glass is often used for a display used in such a mobile device and in-vehicle equipment as described above. A flat glass plate is generally used as such a cover glass. However, from the operability, aesthetic, and other viewpoints, there are cases where a glass plate having a curved surface shape is desired as the cover glass.

Conventionally, as described in Patent Literature 1 and so on, a glass plate having a curved surface shape is manufactured by placing a flat glass plate on a forming die having a curved surface shape, heating the glass plate to a temperature of the softening point thereof or above to soften it, and deforming it along the shape of the forming die under its own weight.

CITATION LIST

Patent Literature

[PTL 1]
Examined Japanese Patent Application Publication No. S35-16443

SUMMARY OF INVENTION

Technical Problem

In the conventional method described in Patent Literature 1 and so on, the surface shape of the forming die is transferred to the glass plate, which deteriorates the surface accuracy of the glass plate. Therefore, in the case where the glass plate is used as a cover glass for a display or the like, there arises a problem in that the surface of the glass plate must be polished.

An object of the present invention is to provide a method that can manufacture a glass plate having a curved surface shape with high surface accuracy even without polishing the surface after forming and a glass plate manufactured by the method.

Solution to Problem

The present invention is directed to a method of manufacturing a glass plate having a curved surface shape, the method including the steps of: preparing an original glass plate, a forming die including a recess corresponding to the curved surface shape, and a forming tool operable to press the original glass plate; placing the original glass plate on the recess in the forming die; heating the original glass plate and the forming die; maintaining a temperature of a surface of the recess in the forming die at a temperature lower than a temperature of the original glass plate; and giving the original glass plate the curved surface shape by pressing the heated original glass plate with the forming tool to deform the original glass plate while bringing the original glass plate into contact with the surface of the recess.

A temperature at which the original glass plate is heated is preferably not lower than a glass transition point of glass forming the original glass plate and not higher than a softening point of the glass.

The temperature of the surface of the recess is preferably maintained at a temperature not lower than a strain point of glass forming the original glass plate and not higher than a glass transition point of the glass.

In a first embodiment of the present invention, the forming tool may include a raised portion corresponding to the curved surface shape and the original glass plate may be given the curved surface shape by pressing the heated original glass plate with the raised portion. In this case, a number of times the original glass plate is pressed with the raised portion may be one.

In a second embodiment of the present invention, the forming tool may include a raised portion having a radius of curvature smaller than that of the curved surface shape and the original glass plate may be given the curved surface shape by pressing the heated original glass plate with the raised portion. In this case, it is preferred that a central portion of the original glass plate be deformed by pressing the central portion with the raised portion and portions of the original glass plate outside the central portion thereof be then deformed by inclining and turning (rolling) the forming tool from side to side and thus pressing the original glass plate with a curved surface of the raised portion.

In a third embodiment of the present invention, the forming tool is a bar-shaped forming tool and the glass plate may be given the curved surface shape by pressing the original glass plate with the forming tool while shifting a position of the forming tool relative to the original glass plate. In this case, the glass plate is preferably deformed by pressing the original glass plate more than once at the same position.

In the present invention, a coolant operable to cool the forming die is preferably introduced into the forming die. Thus, the surface temperature of the recess can be easily maintained lower than the temperature at which the original glass plate is heated. As a result, the surface shape of the recess becomes less likely to be transferred to the original glass plate, which can increase the surface accuracy of the glass plate.

In the present invention, the glass plate is preferably deformed by pressing the glass plate with the forming tool while introducing a coolant into the forming tool. Thus, the surface shape of the forming tool becomes less likely to be transferred to the original glass plate.

The glass plate having a curved surface shape manufactured by the method according to the present invention is, for example, a glass plate for use as a display cover glass or a glass plate for use as a back cover glass for a mobile device.

A glass plate having a curved surface shape according to the present invention is a glass plate having a curved surface shape manufactured by the above-described method according to the present invention.

Advantageous Effects of Invention

In the present invention, a glass plate having a curved surface shape can be manufactured with high surface accuracy even without polishing the surface after forming.

BRIEF DESCRIPTION OF DRAWINGS

FIG. 1 is a schematic cross-sectional view showing a manufacturing step in a first embodiment of the present invention.

FIG. 2 is a perspective view showing an example of a glass plate having a curved surface shape according to the present invention.

FIG. 3 is a side view showing, in the present invention, an example of a flat original glass plate before forming and an example of a glass plate having a curved surface shape after the forming.

FIG. 4 shows a manufacturing step in first to third embodiments of the present invention and is a schematic cross-sectional view showing a state where a flat original glass plate is placed on a forming die.

FIG. 5 is a schematic plan view showing the forming die for use in the first to third embodiments of the present invention.

FIG. 6 shows a manufacturing step in the first to third embodiments of the present invention and is a schematic cross-sectional view showing a state where the flat original glass plate is placed on the forming die in an electric furnace.

FIG. 7 is a schematic cross-sectional view showing a manufacturing step in the first embodiment of the present invention.

FIG. 8 is a schematic cross-sectional view showing a manufacturing step in the second embodiment of the present invention.

FIG. 9 is a schematic cross-sectional view showing a manufacturing step in the second embodiment of the present invention.

FIG. 10 is a schematic cross-sectional view showing a manufacturing step in the second embodiment of the present invention.

FIG. 11 is a schematic cross-sectional view showing a manufacturing step in the second embodiment of the present invention.

FIG. 12 is a schematic cross-sectional view showing a manufacturing step in the third embodiment of the present invention.

FIG. 13 is a schematic cross-sectional view showing a manufacturing step in the third embodiment of the present invention.

DESCRIPTION OF EMBODIMENTS

Hereinafter, a description will be given of preferred embodiments of the present invention. However, the following embodiments are merely illustrative and the present invention is not intended to be limited to the following embodiments. Throughout the drawings, elements having substantially the same functions may be referred to by the same reference signs.

FIG. 2 is a perspective view showing an example of a glass plate having a curved surface shape according to the present invention. A glass plate 1 having a curved surface shape shown in FIG. 2 is given a simple curved surface shape throughout the entire glass plate 1. A manufacturing method according to the present invention can be applied to the manufacture of a glass plate given a simple curved surface shape throughout the entire glass plate 1 as shown in FIG. 2. However, the present invention is not limited to the manufacture of such a glass plate but can be applied to the case of manufacturing a glass plate partly given a curved surface shape, a single glass plate given a plurality of curved surface shapes, or a single glass plate given a three-dimensional curved surface shape.

FIG. 3 is a side view showing, in the present invention, an example of a flat original glass plate 2 before forming and an example of the glass plate 1 having a curved surface shape after the forming. As shown in FIG. 3, the glass plate 1 having a curved surface shape can be manufactured by bending the flat original glass plate 2.

First Embodiment

FIG. 4 shows a manufacturing step in a first embodiment of the present invention and is a schematic cross-sectional view showing a state where a flat glass plate is placed on a forming die.

As shown in FIG. 4, the forming die 10 includes a recess 11. The recess 11 has a curved surface shape corresponding to the curved surface shape to be given to the original glass plate 2. In other words, the recess 11 has a curved surface shape of the same radius of curvature as that of the curved surface shape which the glass plate 1 after undergoing the forming process has. A plurality of coolant introduction pipes 12 are passed through the forming die 10.

FIG. 5 is a schematic plan view showing the forming die for use in the first embodiment of the present invention. As shown in FIG. 5, the coolant introduction pipes 12 are led at one side of the forming die 10 into the forming die 10 and led at the other side thereof out of the forming die 10. The surface of the recess 11 in the forming die 10 can be cooled by allowing a coolant to flow through the coolant introduction pipes 12. The preferred coolant to be used is a gas such as air.

In this embodiment, the surface of the recess 11 in the forming die 10 is coated with thermally-resistant cloth elastically deformable in a thickness direction, such as glass cloth, ceramic cloth or carbon fiber cloth.

In this embodiment, the surface temperature of the recess 11 in the forming die 10 is set at a temperature not lower than the strain point of glass forming the original glass plate 2 and not higher than the glass transition point thereof and more preferably set between the strain point of the glass and the glass transition point minus 30° C. By introducing the coolant into the forming die 10 in the above manner, the surface temperature of the recess 11 can be maintained at such a temperature.

FIG. 6 is a schematic cross-sectional view showing a manufacturing step in the first embodiment of the present invention. As shown in FIG. 6, the flat original glass plate 2 placed on the recess 11 in the forming die 10 is located in an electric furnace 50. A heater 51 is provided in the electric furnace 50. The original glass plate 2 placed on the recess 11 is heated by the heater 51. In this embodiment, the temperature of the original glass plate 2 is not lower than the glass transition point of glass forming the original glass plate 2 and not higher than the softening point of the glass. More preferably, the temperature is lower than the softening point of the glass. By setting the temperature of the original glass plate 2 at such a temperature, the viscosity of the original glass plate 2 can be a viscosity at which both of elastic deformation and plastic deformation occur.

In the above manner, the flat original glass plate 2 placed on the recess 11 in the forming die 10 is heated.

Furthermore, in this embodiment, the original glass plate 2 that can be used is an original glass plate having a thickness of 0.2 mm to 1.5 mm. More preferably, the thickness is 0.3 mm to 1.0 mm. If the original glass plate 2 has such a thickness, the original glass plate 2 can be deformed with a low load in pressing the original glass plate 2 with a forming tool 20, 30, 40 to be described hereinafter. Therefore, the occurrence of scratches on the surface of the original glass plate 2 due to contact with the forming die 10 and the forming tool 20, 30, 40 can be reduced, so that a glass plate 1 having a curved surface shape can be manufactured with high surface accuracy even without polishing the surface after forming.

The structure and configuration of this embodiment described with reference to FIGS. 4 to 6 are common to second and third embodiments to be described later.

FIG. 1 is a schematic cross-sectional view showing a manufacturing step in the first embodiment of the present invention. As shown in FIG. 1, a forming tool 20 in this embodiment is disposed over the heated original glass plate 2. The forming tool 20, as shown in FIG. 1, includes a raised portion 21 having a curved surface shape corresponding to the curved surface shape of the recess 11 in the forming die 10. Therefore, the curved surface shape of the raised portion 21 corresponds to the curved surface shape which the glass plate 1 having a curved surface shape after undergoing the forming process has. In other words, the raised portion 21 of the forming tool 20 has a curved surface shape of the same radius of curvature as that of the curved surface shape which the glass plate 1 after undergoing the forming process has.

A plurality of coolant introduction pipes 22 are passed through the forming tool 20, like the forming die 10. As in the case of the forming die 10, the surface of the raised portion 21 of the forming tool 20 can be cooled by allowing a coolant to flow through the coolant introduction pipes 22. The surface of the raised portion 21 of the forming tool 20 is coated with, like the surface of the recess 11 in the forming die 10, thermally-resistant cloth elastically deformable in a thickness direction.

When the forming tool 20 disposed over the forming die 10 is moved in the direction indicated by the arrow A, i.e., downward, the raised portion 21 of the forming tool 20, as shown in FIG. 1, first comes into contact with a central portion 2a of the original glass plate 2. When the forming tool 20 is further pressed down, the heated original glass plate 2 deforms along the curved surface of the raised portion 21 of the forming tool 20 and concurrently approaches the surface of the recess 11 in the forming die 10. In the present invention, the surface temperature of the recess 11 in the forming die 10 is maintained at a temperature lower than the temperature of the original glass plate 2. Preferably, as in this embodiment, the surface temperature of the recess 11 in the forming die 10 is set at a temperature not lower than the strain point of glass forming the original glass plate 2 and not higher than the glass transition point thereof and more preferably set between the strain point of the glass and the glass transition point minus 30° C. Therefore, a portion of the original glass plate 2 in contact with the surface of the recess 11 in the forming die 10 undergoes a bending process while the surface temperature of the original glass plate 2 drops. Since the surface temperature of the original glass plate 2 drops, the surface of the original glass plate 2 becomes less plastically deformable. Therefore, it can be prevented that the surface shape of the recess 11 is transferred to the surface of the original glass plate 2. Furthermore, since in this embodiment the surface of the recess 11 is cooled, the surface of the original glass plate 2 can be prevented from adhering to the surface of the recess 11.

FIG. 7 is a schematic cross-sectional view showing a manufacturing step in the first embodiment of the present invention. In the state shown in FIG. 7, the forming tool 20 further moves down, so that the original glass plate 2 is sandwiched between the raised portion 21 of the forming tool 20 and the recess 11 in the forming die 10, resulting in the formation of a glass plate 1 having a curved surface shape. In this embodiment, as described above, the original glass plate 2 can be given a curved surface shape while it is prevented that the surface shape of the recess 11 is transferred to the surface of the original glass plate 2. Therefore, there is no need to polish the surface of the glass plate 1 having a curved surface shape after forming. Hence, in the present invention, a glass plate 1 having a curved surface shape can be manufactured with high surface accuracy even without polishing the surface after the forming. In pressing down the forming tool 20 with the forming tool 20 in contact with the glass plate 2, the original glass plate 2 is sandwiched between the raised portion 21 of the forming tool 20 and the recess 11 in the forming die 10 and subjected to the bending process before the temperature of the original glass plate 2 drops to the surface temperature of the raised portion 21 of the forming tool 20.

In this embodiment, a coolant is allowed to flow through the coolant introduction pipes 22 to cool the surface of the raised portion 21 of the forming tool 20 so that the surface temperature of the raised portion 21 is set at a temperature lower than the temperature of the original glass plate 2, preferably at a temperature not lower than the strain point of glass forming the original glass plate 2 and not higher than the glass transition point thereof, and more preferably between the strain point of the glass and the glass transition point minus 30° C. Thus, it can be prevented that the surface shape of the raised portion 21 of the forming tool 20 is transferred to the surface of the original glass plate 2. Furthermore, since the surface of the raised portion 21 is cooled, the surface of the original glass plate 2 can be prevented from adhering to the surface of the raised portion 11 of the forming tool 20.

Second Embodiment

FIG. 8 is a schematic cross-sectional view showing a manufacturing step in a second embodiment of the present invention. In this embodiment, a forming tool 30 shown in FIG. 8 is used. The forming tool 30 includes a raised portion 31 having a radius of curvature smaller than that of the curved surface shape of the recess 11 in the forming die 10. Therefore, the raised portion 31 has a radius of curvature smaller than that of the curved surface shape which the glass plate 1 after undergoing the forming process has.

A plurality of coolant introduction pipes 32 are passed through the forming tool 30, like the forming tool 20 in the first embodiment. Like the forming tool 20 in the first embodiment, the surface of the raised portion 31 of the forming tool 30 can be cooled by allowing a coolant to flow through the coolant introduction pipes 32. The surface of the raised portion 31 of the forming tool 30 is coated with, like the forming tool 20 in the first embodiment, thermally-resistant cloth elastically deformable in a thickness direction.

When the forming tool 30 disposed above the forming die 10 is moved in the direction indicated by the arrow B, i.e., downward, the raised portion 31 of the forming tool 30, as shown in FIG. 8, first comes into contact with a central portion 2a of the original glass plate 2. When the forming tool 30 is further pressed down, as shown in FIG. 9, the central portion 2a of the heated original glass plate 2 approaches the surface of the recess 11 in the forming die 10 while deforming and then comes into contact with the surface of the recess 11. In this embodiment, the surface temperature of the recess 11 in the forming die 10 is set at a temperature lower than the temperature of the original glass plate 2, preferably at a temperature not lower than the strain point of glass forming the original glass plate 2 and not higher than the glass transition point thereof, and more preferably between the strain point of the glass and the glass transition point minus 30° C. Therefore, the central portion 2a of the original glass plate 2 in contact with the surface of the recess 11 in the forming die 10 drops in temperature and becomes less plastically deformable.

Next, the forming tool 30 is inclined and turned (rolled) in the direction of the arrow C shown in FIG. 9. Thus, as shown in FIG. 10, one region 2b of the original glass plate 2 outside the central portion 2a thereof is pressed by a curved surface 31a of the raised portion 31 and thus brought into contact with the surface of the recess 11. As a result, the one region 2b of the original glass plate 2 is deformed along the curved surface shape of the recess 11 and the temperature of the original glass plate 2 in contact with the surface of the recess 11 is reduced to make the one region 2b of the original glass plate 2 difficult to plastically deform.

Next, the forming tool 30 is inclined and turned (rolled) in the direction of the arrow D shown in FIG. 10. Thus, as shown in FIG. 11, the other region 2c of the original glass plate 2 outside the central portion 2a thereof is pressed by the curved surface 31a of the raised portion 31 and thus brought into contact with the surface of the recess 11. As a result, the other region 2c of the original glass plate 2 is deformed along the curved surface shape of the recess 11 and the temperature of the original glass plate 2 in contact with the surface of the recess 11 is reduced to make the other region 2c of the original glass plate 2 difficult to plastically deform. In pressing down the forming tool 30 with the forming tool 30 in contact with the original glass plate 2, the original glass plate 2 is brought into contact with the surface of the recess 11 in the forming die 10 and subjected to the bending process by turning (rolling) the forming tool 30 before the temperature of the original glass plate 2 drops to the surface temperature of the raised portion 31 of the forming tool 30.

In this embodiment, by in the above manner pressing the original glass plate 2 with the curved surface 31a of the raised portion 31 of the forming tool 30 to bring the original glass plate 2 into contact with the surface of the recess 11 in the forming die 10, the original glass plate 2 can be deformed and given a curved surface shape. Since, as previously described, the original glass plate 2 in contact with the surface of the recess 11 drops in temperature, it becomes less plastically deformable. Therefore, it can be prevented that the surface shape of the recess 11 is transferred to the surface of the original glass plate 2. Furthermore, since also in this embodiment a coolant is introduced into the forming die 10 to cool the surface of the recess 11, it can be prevented that the surface shape of the recess 11 is transferred to the surface of the original glass plate 2. Moreover, the original glass plate 2 can be prevented from adhering to the surface of the recess 11.

In this embodiment, the original glass plate 2 can be given a curved surface shape while it is prevented that the surface shape of the recess 11 is transferred to the surface of the original glass plate 2. Therefore, a glass plate 1 having a curved surface shape can be manufactured with high surface accuracy even without polishing the surface after forming.

Also in this embodiment, the surface of the raised portion 31 of the forming tool 30 can be cooled by introducing a coolant into the forming tool 30. Thus, the surface temperature of the raised portion 31 of the forming tool 30 can be set at a temperature lower than the temperature of the original glass plate 2, preferably at a temperature not lower than the strain point of glass forming the original glass plate 2 and not higher than the glass transition point thereof, and more preferably between the strain point of the glass and the glass transition point minus 30° C., so that it can be prevented that the surface shape of the raised portion 31 of the forming tool 30 is transferred to the surface of the original glass plate 2.

Third Embodiment

FIG. 12 is a schematic cross-sectional view showing a manufacturing step in a third embodiment of the present invention. In this embodiment, a forming tool 40 shown in FIG. 12 is used. The forming tool 40 is a bar-shaped forming tool, inside of which a through hole 41 for introducing a coolant is formed. Therefore, the forming tool 40 can be formed of, for example, a thermally-resistant pipe. An example that can be cited as the thermally-resistant pipe is a metallic or ceramic pipe.

Like the forming tool 20 in the first embodiment, the surface of the forming tool 40 can be cooled by allowing a coolant to flow through the through hole 41 for introducing a coolant. The surface of the forming tool 40 is coated with, like the forming tool 20 in the first embodiment, thermally-resistant cloth elastically deformable in a thickness direction.

As shown in FIG. 12, the forming tool 40 is disposed above the original glass plate 2 placed on the recess 11 in the forming die 10. Next, the forming tool 40 is moved down to press the central portion 2a of the original glass plate 2 and thus deform the original glass plate 2. Next, the forming tool 40 is moved in the direction of the arrow E shown in FIG. 13, i.e., upward, and then moved again in the direction of the arrow E', i.e., downward, to press the original glass plate 2 and thus deform the original glass plate 2. By repeating the movement of the forming tool 40 in the direction of the arrow E and the movement thereof in the direction of the arrow E' plural times in the above manner, the original glass plate 2 is gradually deformed and finally brought into contact with the surface of the recess 11. In this embodiment, the surface temperature of the recess 11 in the forming die 10 is set at a temperature lower than the temperature of the original glass plate 2, preferably at a temperature not lower than the strain point of glass forming the original glass plate 2 and not higher than the glass transition point thereof, and more preferably between the strain point of the glass and the glass transition point minus 30° C. Therefore, the central portion 2a of the original glass plate 2 in contact with the surface of the recess 11 in the forming die 10 drops in temperature and becomes less plastically deformable.

Next, the movement of the forming tool 40 in the direction of the arrow F shown in FIG. 13 and the movement thereof in the direction of the arrow F' are repeated plural times. Thus, a portion of the original glass plate 2 pressed by the forming tool 40 is gradually deformed and finally brought into contact with the surface of the recess 11. The portion of the original glass plate 2 in contact with the surface of the recess 11 drops in temperature and becomes less plastically deformable. Next, in the same manner, the movement of the forming tool 40 in the direction of the arrow G shown in FIG. 13 and the movement thereof in the direction of the arrow G' are repeated plural times, the movement thereof in the direction of the arrow H and the movement thereof in the direction of the arrow H' are then repeated plural times, and the movement thereof in the direction of the arrow I and the movement thereof in the direction of the arrow I' are then repeated plural times. In pressing the forming tool 40 in each of the above directions with the forming tool 40 in contact with the original glass plate 2, the original glass plate 2 is brought into contact with the surface of the recess 11 in the forming die 10 and subjected to the bending process before the temperature of the original glass plate 2 reaches the surface temperature of the forming tool 40.

By, in the above manner, pressing specified portions of the original glass plate 2 with the forming tool 40 to deform them and thus giving the original glass plate 2 a curved surface shape, a glass plate 1 having a curved surface shape can be manufactured. Since the portions of the original glass plate 2 in contact with the surface of the recess 11 drop in temperature, they become less plastically deformable. Therefore, it can be prevented that the surface shape of the recess 11 is transferred to the surface of the original glass plate 2. Furthermore, since also in this embodiment a coolant is introduced into the forming die 10 to cool the surface of the recess 11, it can be prevented that the surface shape of the recess 11 is transferred to the surface of the original glass plate 2. Moreover, the original glass plate 2 can be prevented from adhering to the surface of the recess 11.

In this embodiment, the original glass plate 2 can be given a curved surface shape while it is prevented that the surface shape of the recess 11 is transferred to the surface of the original glass plate 2. Therefore, a glass plate having a curved surface shape can be manufactured with high surface accuracy even without polishing the surface after forming.

Also in this embodiment, the surface of the forming tool 40 can be cooled by introducing a coolant into the forming tool 40. Thus, the surface temperature of the forming tool 40 can be set at a temperature lower than the temperature of the original glass plate 2, preferably at a temperature not lower than the strain point of glass forming the original glass plate 2 and not higher than the glass transition point thereof, and more preferably between the strain point of the glass and the glass transition point minus 30° C., so that it can be further prevented that the surface shape of the forming tool 40 is transferred to the surface of the original glass plate 2.

The glass plate 1 having a curved surface shape according to the present invention can be used as a display cover glass for use in mobile devices, such as cellular phones, smartphones, notebook personal computers, and tablet personal computers, and in-vehicle equipment, such as car-mounted navigation systems, or as a back cover glass for use in mobile devices. In the case of use as a display cover glass, the curved surface can be a portion of a display on which an image is displayed.

REFERENCE SIGNS LIST

1 . . . glass plate having a curved surface shape
2 . . . original glass plate
2*a* . . . central portion
2*b* . . . one region
2*c* . . . the other region
10 . . . forming die
11 . . . recess
12 . . . coolant introduction pipe
20 . . . forming tool
21 . . . raised portion
22 . . . coolant introduction pipe
30 . . . forming tool
31 . . . raised portion
31*a* . . . curved surface
32 . . . coolant introduction pipe
40 . . . forming tool
41 . . . through hole for introducing a coolant
50 . . . electric furnace
51 . . . heater

The invention claimed is:

1. A method of manufacturing a glass plate having a curved surface shape, the method comprising the steps of:
preparing an original glass plate, a forming die including a recess corresponding to the curved surface shape, and a forming tool operable to press the original glass plate;
placing the original glass plate on the recess in the forming die;
heating the original glass plate and the forming die;
maintaining a temperature of a surface of the recess in the forming die at a temperature lower than a temperature of the original glass plate; and
giving the original glass plate the curved surface shape by pressing the heated original glass plate with the forming tool to deform the original glass plate while bringing the original glass plate into contact with the surface of the recess; wherein
the forming tool includes a raised portion having a radius of curvature smaller than that of the curved surface shape and a central portion of the original glass plate is deformed by pressing only the central portion with the raised portion, and portions of the original glass plate outside the central portion thereof are then deformed by inclining and turning the forming tool from side to side and thus pressing the original glass plate with a curved surface of the raised portion.

2. The method of manufacturing a glass plate having a curved surface shape according to claim 1, wherein a temperature at which the original glass plate is heated is not lower than a glass transition point of glass forming the original glass plate and not higher than a softening point of the glass.

3. The method of manufacturing a glass plate having a curved surface shape according to claim 1, wherein the temperature of the surface of the recess is maintained at a temperature not lower than a strain point of glass forming the original glass plate and not higher than a glass transition point of the glass.

4. The method of manufacturing a glass plate having a curved surface shape according to claim 1, wherein a coolant operable to cool the forming die is introduced into the forming die.

5. The method of manufacturing a glass plate having a curved surface shape according to claim 1, wherein the original glass plate is deformed by pressing the original glass plate with the forming tool while introducing a coolant into the forming tool.

6. A method of manufacturing a glass plate having a curved surface shape, the method comprising the steps of:
preparing an original glass plate, a forming die including a recess corresponding to the curved surface shape, and a forming tool operable to press the original glass plate;
placing the original glass plate on the recess in the forming die;

heating the original glass plate and the forming die;
maintaining a temperature of a surface of the recess in the forming die at a temperature lower than a temperature of the original glass plate; and
giving the original glass plate the curved surface shape by pressing the heated original glass plate with the forming tool to deform the original glass plate while bringing the original glass plate into contact with the surface of the recess; wherein
the forming tool is a bar-shaped forming tool and the original glass plate is given the curved surface shape by pressing the original glass plate with the forming tool while shifting a position of the forming tool relative to the original glass plate; and
the original glass plate is deformed by pressing the original glass plate more than once at the same position with the forming tool.

* * * * *